US009929658B2

(12) United States Patent
Karlsson et al.

(10) Patent No.: US 9,929,658 B2
(45) Date of Patent: Mar. 27, 2018

(54) CONTROLLING A SWITCHED MODE POWER SUPPLY WITH MAXIMISED POWER EFFICIENCY

(75) Inventors: Magnus Karlsson, Oskarshamn (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 364 days.

(21) Appl. No.: 14/406,243

(22) PCT Filed: Jun. 8, 2012

(86) PCT No.: PCT/EP2012/060892
§ 371 (c)(1),
(2), (4) Date: Jul. 29, 2015

(87) PCT Pub. No.: WO2013/182249
PCT Pub. Date: Dec. 12, 2013

(65) Prior Publication Data
US 2015/0372605 A1 Dec. 24, 2015

(51) Int. Cl.
*H02M 3/335* (2006.01)
*H02M 3/337* (2006.01)
(Continued)

(52) U.S. Cl.
CPC .......... *H02M 3/33546* (2013.01); *G05F 1/10* (2013.01); *H02M 3/3376* (2013.01);
(Continued)

(58) Field of Classification Search
CPC .................................................... H02M 3/335
See application file for complete search history.

(56) References Cited

U.S. PATENT DOCUMENTS 7,269,034 B2   9/2007 Schlecht
7,272,021 B2   9/2007 Schlecht
(Continued)

FOREIGN PATENT DOCUMENTS

CN     1407701 A      4/2003
TW     201114151 A    4/2011
WO     2012007055 A1  1/2012

*Primary Examiner* — Jue Zhang
*Assistant Examiner* — Trinh Q Dang

(57) ABSTRACT

A control circuit operable to generate a control signal to control the duty cycle of a switched mode power supply is provided. The control circuit comprises an input terminal for receiving a signal indicative of an input voltage ($V_{in}$) of the switched mode power supply, and a reference signal generator to generate, in dependence upon the received signal, a reference signal ($V_R$) that is a function of the input voltage ($V_{in}$). The control circuit further comprises an error signal generator to receive a signal indicative of an output voltage ($V_{out}$) of the switched mode power supply and to generate an error signal ($V_E$) based on the reference signal ($V_R$) and based on the output voltage, a low pass filter, and a duty cycle control signal generator to generate the control signal to control the duty cycle of the switched mode power supply in dependence upon the error signal ($V_E$).

17 Claims, 15 Drawing Sheets

(51) Int. Cl.
  *G05F 1/10* (2006.01)
  *H02M 1/00* (2006.01)
(52) U.S. Cl.
  CPC .. *H02M 3/3378* (2013.01); *H02M 2001/0022* (2013.01); *H02M 2001/0025* (2013.01)

(56) References Cited

U.S. PATENT DOCUMENTS

| | | | |
|---|---|---|---|
| 7,558,083 | B2 | 7/2009 | Schlecht |
| 7,564,702 | B2 | 7/2009 | Schlecht |
| 7,787,261 | B2 | 8/2010 | Farrington |
| 8,106,639 | B1 | 1/2012 | Ju |
| 2005/0269999 | A1* | 12/2005 | Liu ................ H02M 1/32 323/222 |
| 2009/0243580 | A1* | 10/2009 | Chen ............... H02M 3/156 323/288 |
| 2010/0003932 | A1* | 1/2010 | Morimoto ........... H03C 5/00 455/102 |
| 2010/0026263 | A1* | 2/2010 | Moussaoui ....... H02M 3/1582 323/283 |
| 2011/0062926 | A1* | 3/2011 | Qiu ............... H02M 3/1588 323/282 |
| 2011/0084676 | A1 | 4/2011 | Lin |
| 2011/0292704 | A1* | 12/2011 | Makino ........... H02M 1/4208 363/126 |
| 2013/0176006 | A1* | 7/2013 | van Ettinger ......... G05F 1/56 323/265 |

\* cited by examiner

CONTROLLING A SWITCHED MODE POWER SUPPLY WITH MAXIMISED POWER EFFICIENCY

This application is a 371 of International Application PCT/EP2012/060892, filed Jun. 8, 2012, the disclosure of which is fully incorporated herein by reference.

TECHNICAL FIELD

The present invention generally relates to the field of switched mode power supplies (sometimes referred to as switch mode power supplies or switching mode power supplies) and more specifically to the control of the duty cycle of a switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching defining the efficiency with which an input voltage is converted to a desired output voltage.

In most SMPS topologies, the output voltage, $V_{out}$, is directly proportional to the input voltage, $V_{in}$:

$$V_{out} \propto nDV_{in} \qquad \text{Equation 1}$$

In Equation 1 above, D is the duty cycle of the switching, and $n=n_s/n_p$ is the transformer ratio (the number of turns on the secondary side, $n_s$, divided by the number of turns on the primary side, $n_p$) if a transformer is used in the SMPS or n=1 if no transformer is used. The duty cycle is critical to achieving high converter efficiency, and a duty cycle of 100% will generally yield the maximum efficiency.

A number of different control strategies for controlling the duty cycle of an SMPS are known.

One method of control is used in fixed ratio converters or Intermediate Bus Converters (IBCs), which are also referred to as unregulated converters. These lack all control of the output voltage but run with a maximised duty cycle. This yields maximised power efficiency since the converter transfers energy almost 100% of the time, with the exception of the dead time needed during switching. With this strategy, the output voltage varies with the input voltage according to Equation 1 above. Unregulated converters with different topologies are disclosed in U.S. Pat. No. 7,272,021, U.S. Pat. No. 7,558,083, U.S. Pat. No. 7,564,702 and U.S. Pat. No. 7,269,034, for example. Furthermore, narrow regulation of the voltage can be taken care of by second layer SMPSs called Point of Load (POL) regulators, this power architecture being referred to as Intermediate Bus Architecture (IBA), for example as disclosed in U.S. Pat. No. 7,787,261.

Semi-regulated converters compensate for a varying input voltage (line regulation) at the expense of a varying duty cycle, which reduces power efficiency. An example of such a converter is disclosed in U.S. Pat. No. 7,787,261. The converter load can affect the output voltage, causing it to decrease with increasing load, a phenomenon known as droop. Since the output of an SMPS has an LC filter then load transients cause the output voltage to oscillate, and only inherent parasitic resistances dampen the oscillations.

Quasi-regulated bus converters, for example as disclosed in U.S. Pat. No. 7,787,261, are line regulated in only a part of the input voltage range, while in other parts of the input voltage range they are unregulated using 100% duty cycle to maximise efficiency. This yields an increased input voltage range without increasing the output voltage range.

Output regulated converters compensate for varying load conditions and input voltage changes by feedback of the output voltage. Voltage feed forward is often added in order to reduce output voltage disturbances due to input voltage transients. This type of regulation offers the most stable output voltage at the cost of lower efficiency.

Irrespective of the control strategy used, it is preferable for the output voltage of an SMPS to remain at its desired level under all conditions. However, transients and changes of the input voltage will cause the output voltage to change almost immediately. This can introduce large changes in the output voltage of the SMPS. Typically, only the inertia in an output filter of the SMPS will decrease this effect.

All the above-described control strategies have drawbacks in terms of output voltage tolerance, transient responses and power efficiency. Furthermore, many of these variables are dependent and optimising one makes the others worse.

SUMMARY

In view of the problems in known SMPS control strategies, the present invention aims to provide an apparatus and method for generating a control signal to control the duty cycle of an SMPS in such a way that high power efficiency is maintained, whilst improving the output voltage response to transients and other operational characteristics as compared to known strategies.

Furthermore, the duty cycle control scheme described herein addresses the following problem which has been identified by the inventors: when the output of the SMPS is connected to a load capable to drawing a large current (e.g. a large capacitor) and is required to respond rapidly to changes in the input voltage of the SMPS, the output current may temporarily rise to an undesirably high level. This transient output current increase may be sufficient to damage the SMPS or, if the SMPS is provided with an over-current protection (OCP) mechanism, at least trip the OCP and thus cause power delivery to be interrupted.

As will be explained in the following, an SMPS control circuit according to an embodiment of the present invention allows such damage to the SMPS or OCP triggering to be avoided whilst still enabling the SMPS to respond quickly to rapid input voltage changes.

As a further advantage, the control circuit allows high frequency noise at both the input and output of the SMPS to be suppressed, thereby simplifying the filtering requirements for the SMPS.

More specifically, the present invention provides a control circuit operable to generate a control signal to control the duty cycle of a switched mode power supply. The control circuit comprises an input terminal for receiving a signal indicative of an input voltage of the switched mode power supply, and a reference signal generator operatively connected to the input terminal (either directly, or indirectly via one or more electrical components) so as to receive the signal indicative of the input voltage of the switched mode power supply, the reference signal generator being operable to generate, in dependence upon the received signal, a reference signal that is a function of the input voltage. The control circuit further comprises an error signal generator arranged to receive a signal indicative of an output voltage of the switched mode power supply and operable to generate an error signal based on the reference signal and based on the output voltage. The control circuit also includes a low pass filter connected between the input terminal and the error signal generator, in series with the reference signal generator, and a duty cycle control signal generator operable to generate the control signal to control the duty cycle of the switched mode power supply in dependence upon the error signal.

The present invention also provides a method of generating a control signal by a control circuit to control the duty cycle of a switched mode power supply. The method comprises a reference signal generation process comprising: receiving a signal indicative of an input voltage of the switched mode power supply; and generating a reference signal that is a function of the input voltage, wherein at least one low-pass filtering operation is performed as part of the reference signal generation process so that the reference signal is a filtered signal. The method further comprises an error signal generation process comprising: receiving a signal indicative of an output voltage of the switched mode power supply; and generating an error signal based on the reference signal and based on the output voltage. The method also comprises a duty cycle control signal generation process, comprising generating a control signal to control the duty cycle of the switched mode power supply in dependence upon the error signal.

BRIEF DESCRIPTION OF THE DRAWINGS

Embodiments of the invention will now be described, by way of example only, with reference to the accompanying drawings in which.

DETAILED DESCRIPTION OF EMBODIMENTS

As will be explained in detail below, a control circuit according to an embodiment of the invention includes a low-pass filter connected between an input terminal of the control circuit that receives a signal indicative of an input voltage of the SMPS, and an error signal generator of the control circuit that functions to generate an error signal using a signal based on the received signal. The control circuit uses the error signal to generate a control signal for controlling the SMPS duty cycle. The low-pass filter limits the slew rate for the SMPS output voltage change when the input voltage changes, and thus the accompanying change in the SMPS load current, and is therefore effective in suppressing load current transients that would otherwise occur in response to input voltage fluctuations, as well as in suppressing noise in both the input and output voltage lines of the SMPS.

In addition to the aforementioned reference signal generator, the control circuit may optionally include an offset reference signal generator for generating an offset reference signal by combining the reference signal with an offset signal, the offset being independent of the input voltage. Where such an offset reference signal generator is used, control of the duty cycle of the SMPS on the basis of the offset reference signal causes the SMPS to operate effectively as if is has a variable transformer turns ratio that varies with the input voltage. As will be explained in the following, the offsetting of this reference voltage allows highly efficient SMPS operation to be achieved over a wide range of combinations of desired input and output voltage bands that may be defined independently of one another by the user, thereby improving the usability of the SMPS across a wide range of applications.

First Embodiment

Figure 1:
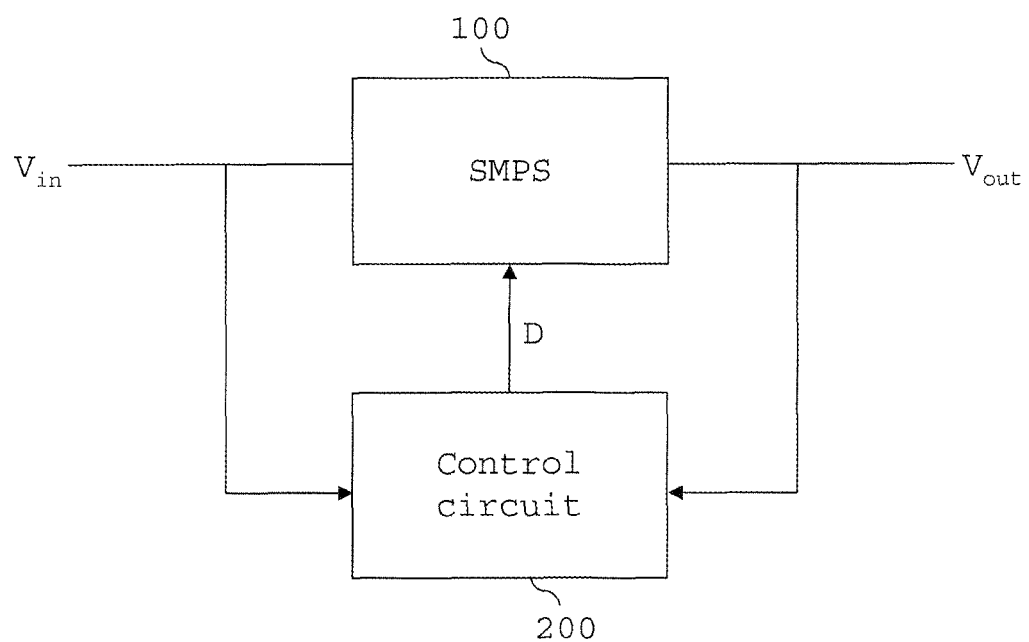
FIG. 1 is a block diagram of a switched mode power supply and a control circuit according to a first embodiment of the present invention, for generating a control signal for controlling the switched mode power supply.

FIG. 1 depicts a top-level block diagram of a switched mode power supply (SMPS) 100 and control circuit 200. The control circuit 200 is arranged to receive signals indicative of the input voltage $V_{in}$ and the output voltage $V_{out}$ of the SMPS 100. These signals may comprise analogue signals of the voltages themselves or digital signals containing information defining voltage values measured by measurement equipment (not shown). Based on the signals indicative of the SMPS input voltage and the signals indicative of the output SMPS voltage, the control circuit 200 is operable to generate a control signal D to control the duty cycle of the SMPS 100. It will be appreciated that the control circuit 200 can be made and sold separately from the SMPS 100.

Figure 2:
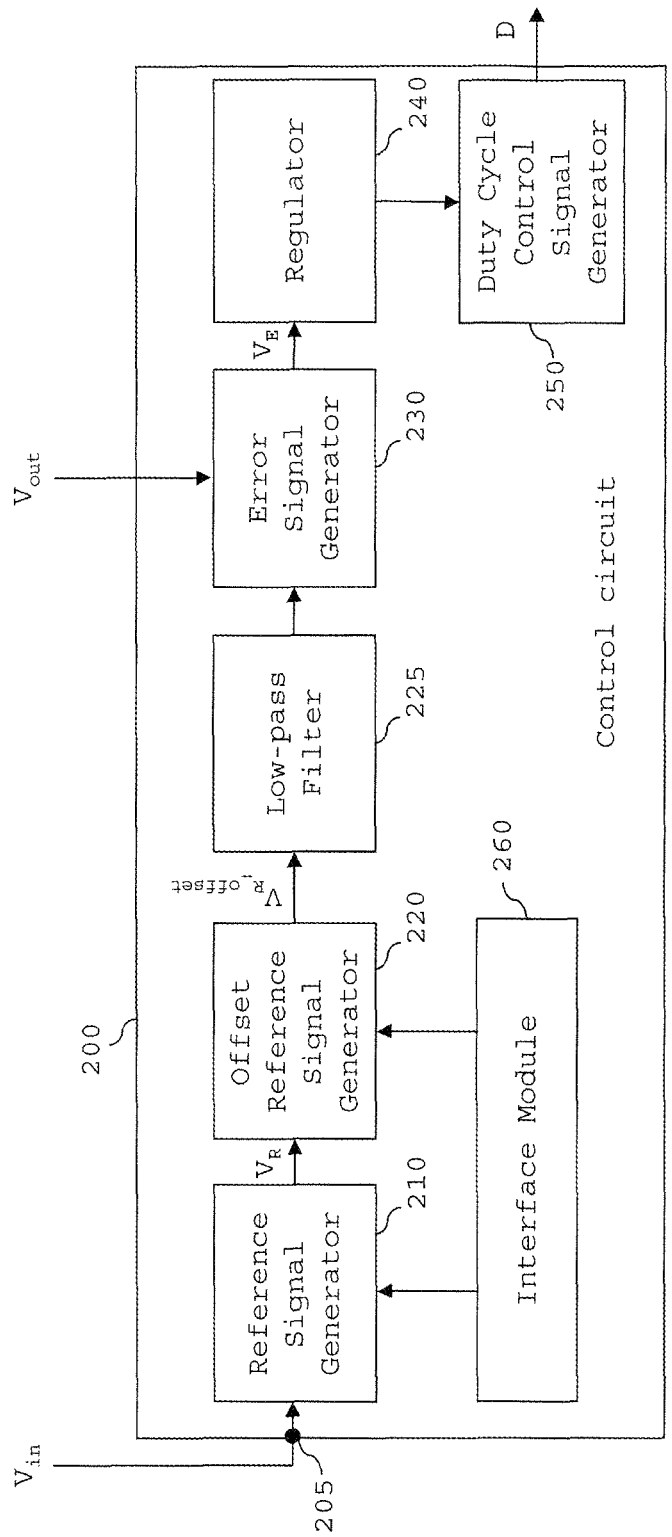
FIG. 2 is a block diagram showing further detail of the control circuit according to the first embodiment of the present invention.

FIG. 2 is a schematic block diagram of the control circuit 200. The control circuit 200 comprises an input terminal 205, a reference signal generator 210, optionally an offset reference signal generator 220, a low-pass filter 225, an error signal generator 230, optionally a regulator 240, a duty cycle control signal generator 250, and optionally an interface module 260 via which settings of the reference signal generator 210 and offset reference signal generator 220 (if included) may be adjusted as described below.

The reference signal generator 210 is arranged to receive a signal indicative of an input voltage $V_{in}$ of the SMPS 100 via the input terminal 205, and operable to generate a variable reference signal $V_R$ which is dependent upon the input voltage $V_{in}$. More particularly, the reference signal generator 210 is arranged to generate the reference signal $V_R$ as a function of the input voltage $V_{in}$. This function, herein denoted $f(V_{in})$, can be changed by the reference signal generator 210 according to user instructions that may be communicated via the interface module 260.

The offset reference signal generator 220 is operable to generate an offset reference signal, $V_{R\_offset}$, by combining the reference signal $V_R$ generated by the reference signal generator 210 with an offset signal, $V_{offset}$, the offset signal $V_{offset}$ being independent of the input voltage $V_{in}$.

It should be noted that the functions of the reference signal generator 210 and the offset reference signal generator 220 may be combined into a single component of the control circuit 200, which generates, in a single step, an offset reference signal $V_{R\_offset}$ in the form of a voltage that is offset in relation to the input voltage $V_{in}$, the size of the offset being independent of $V_{in}$.

The low-pass filter 225 may be any suitable type of low-pass filter for low-pass filtering a signal to remove higher-frequency components thereof. The low-pass filter 225 may be a digital filter or it may be implemented in the analog domain, for example as a simple first-order RC filter or a more complex filter network, in accordance with requirements.

Figure 3:
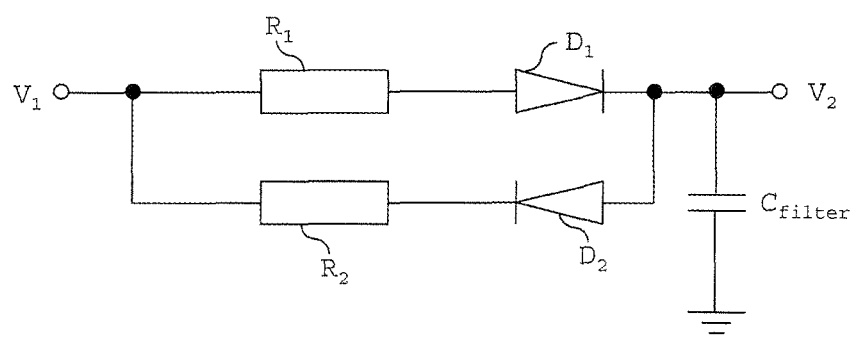
FIG. 3 shows an example of an analog low-pass filter with different time constants for positive and negative voltage transients.

The low-pass filter 225 may, as in the present embodiment, be arranged to respond to an increase in the input voltage $V_{in}$ of the SMPS 100 with a first time constant, and to a decrease in the input voltage $V_{in}$ of the SMPS 100 with a second time constant that is different from the first time constant. To achieve effective noise suppression, the first time constant is preferably set to a value which is no smaller than that of the output filter time constant. The value of the first time constant will depend on the allowed inrush current level and the output capacitance, but will in many practical applications be within the range from 0.3 ms to 3 ms. The second time constant may, for example, be within the range from 60 microseconds to 0.6 ms. Such a low-pass filter 225 may be implemented as shown in FIG. 3, using two resistors $R_1$ and $R_2$ and two diodes $D_1$ and $D_2$, which are connected to a filter capacitor $C_{filter}$ in the manner shown.

The two time constants are preferably user-adjustable, so that the user can adjust them in accordance with the capacitance of a load capacitor connected to the output of the SMPS 100 in order to maintain the size of the charge and discharge currents of the capacitor within respective predetermined ranges of values. In an analog implementation, the time constants may be made user-adjustable e.g. by using variable resistors and/or capacitor in the filter circuit. A low-pass filter having the same time constant for rising/falling input signals may similarly be made to allow the time constant to be adjusted by the user.

Referring again to FIG. 2, the error signal generator 230 is arranged to receive a signal indicative of the output voltage $V_{out}$ of the SMPS 100, as well as the offset reference signal $V_{R\_offset}$ which has been generated by the offset reference signal generator 220 and filtered by the low-pass filter 225. The error signal generator 230 is operable to generate an error signal $V_E$ based on the filtered offset reference signal $V_{R\_offset}$ and based on the output voltage $V_{out}$. For comparison, in a conventional fully-regulated converter, the control circuit measures the output voltage $V_{out}$ of the SMPS and this is then compared with a constant reference signal that is set to yield a desired output voltage.

The error signal $V_E$ is then fed into an optional regulator 240 or, if the regulator 240 is not provided, the error signal $V_E$ is fed into the duty cycle control signal generator 250. The regulator 240 may be provided to generate, in dependence upon the error signal $V_E$, a signal that defines a duty cycle ratio.

The duty cycle control signal generator 250 is arranged to receive the output of the regulator 240 (or the error signal $V_E$ if the regulator is not provided) and is operable to generate the required control signal D to control the duty cycle of the SMPS 100.

Figure 4:
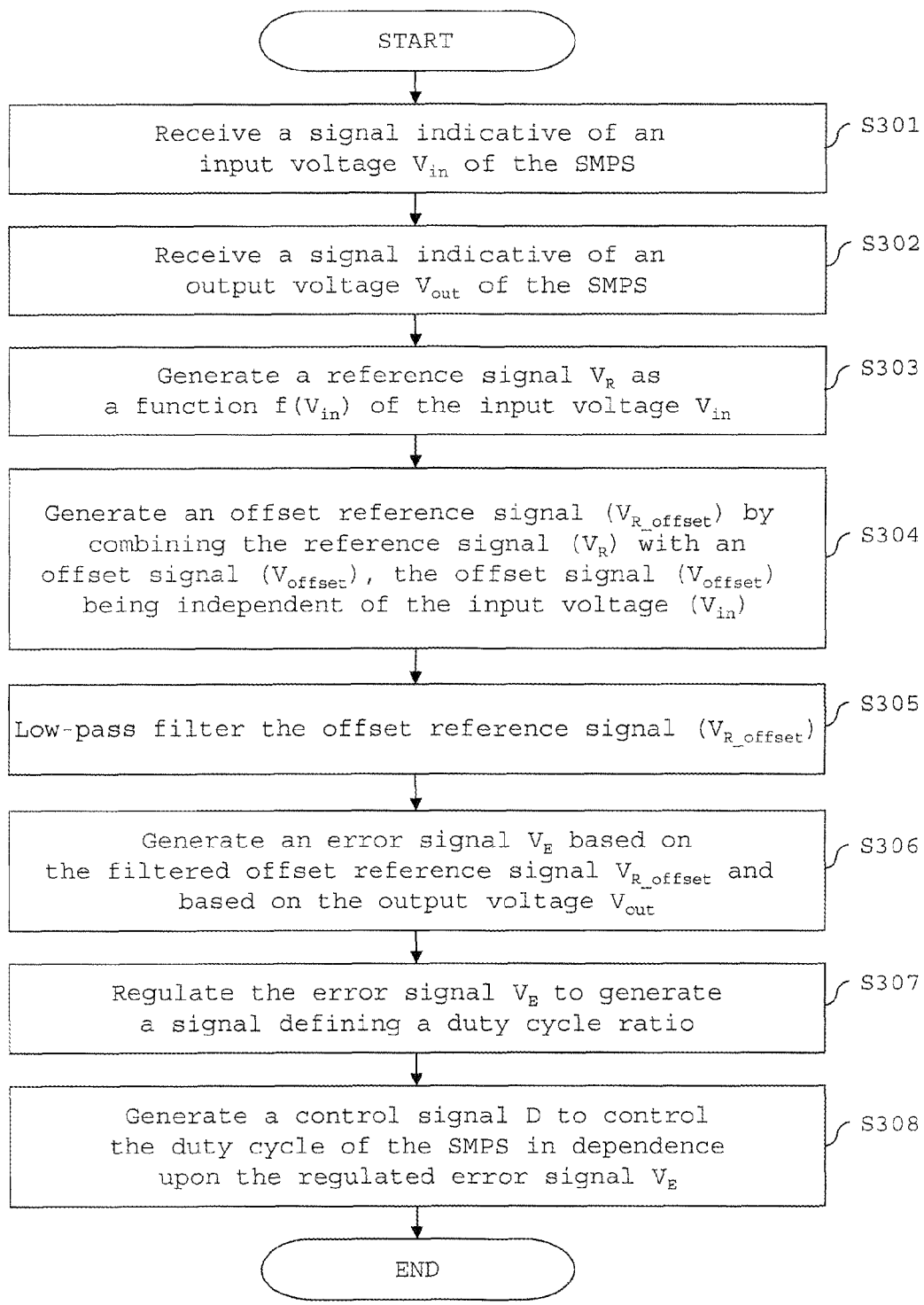
FIG. 4 is a flowchart showing the processes performed by the control circuit of the first embodiment of the present invention.

FIG. 4 is a flow chart showing the processing operations performed by the control circuit 200 of FIG. 2 for generating a control signal D to control the duty cycle of the SMPS 100.

Referring to FIG. 4, in step S301, the reference signal generator 210 receives a signal indicative of an input voltage $V_{in}$ from the SMPS 100. The received signal may be an analogue representation of the input voltage $V_{in}$ of the SMPS 100 or it may be a digital representation.

At step S302, the error signal generator 230 receives a signal indicative of the output voltage $V_{out}$ of the SMPS 100. The received signal may similarly be an analogue representation of the output voltage $V_{out}$ of the SMPS 100 or it may be a digital representation thereof.

At step S303, the reference signal generator 210 generates a variable reference signal $V_R$ as a function of the input voltage $V_{in}$. The function, $f(V_{in})$ may, for example, be a linear function, with the reference signal generator 210 generating the variable reference signal $V_R$ by multiplying the received signal (which is indicative of the input voltage $V_{in}$) by a scaling factor. The function $f(V_{in})$ may alternatively be a non-linear function of the received signal, e.g. a quadratic or a higher-order polynomial function, and it may have one or more discontinuities. The function $f(V_{in})$ may also be defined piece-wise for two or more working regions of the input voltage $V_{in}$. In general, the reference signal generator 210 generates the reference signal $V_R$ in step S303 as any function of the input voltage $V_{in}$ which is such that the reference signal $V_R$ is zero when the input voltage $V_{in}$ is zero (in other words, a function whose plot passes through the origin).

At step S304, the offset reference signal generator 220 generates an offset reference signal $V_{R\_offset}$ by combining the reference signal $V_R$ generated at step S303 with an offset signal, $V_{offset}$. As noted above, the offset signal $V_{offset}$ is not dependent on the input voltage $V_{in}$ and may be generated by the offset reference signal generator 220 itself, as in the present embodiment, or it may be generated externally of the control circuit 200 and received by the offset reference signal generator 220. In either case, the offset reference signal generator 220 combines the reference signal $V_R$ with the offset signal $V_{offset}$, for example by adding these signals together, as in the present embodiment. As noted above, the functions of the reference signal generator 210 and the offset reference signal generator 220 may be combined into a single component of the control circuit 200, which generates, in a single step, an offset reference signal $V_{R\_offset}$ in the form of a voltage that is offset in relation to the input voltage $V_{in}$, the size of the offset being independent of $V_{in}$. In this case, steps S303 and S304 are combined as a single step.

At step S305, the low-pass filter 225 filters the offset reference signal $V_{R\_offset}$ generated by the offset signal generator 220.

At step S306, the error signal generator 230 generates an error signal $V_E$ based on both the filtered offset reference signal $V_{R\_offset}$ and the output voltage $V_{out}$.

Optionally, the process may then proceed with step S307, at which the regulator 240 regulates the error signal $V_E$ to generate a signal defining a duty cycle ratio.

At step S308, the duty cycle control signal generator 250 generates a control signal D to control the duty cycle of the SMPS 100. The generated control signal D is dependent upon the error signal $V_E$ and, if the regulation step of S307 is performed, then the control signal D is generated in dependence upon the signal defining a duty cycle ratio.

Thus, it will be appreciated that the control circuit 200 of the present embodiment performs a reference signal generation process comprising steps S301, S303, S304 and S305, which produce a reference signal filtered with respect to changes in the input voltage $V_{in}$. The control circuit 200 also performs an error signal generation process comprising steps S302 and S306, which produce an error signal based on the filtered reference signal, and a duty cycle control signal generation process comprising step S308, which produces a signal to control the duty cycle based on the error signal.

Further details of the operation of the control circuit 200 will now be described with reference to FIG. 5, which shows exemplary forms which the components shown in FIG. 2 may take. In particular, FIG. 5 illustrates an exemplary configuration of the offset reference signal generator 220 that enables it to generate an offset reference signal, as well as exemplary implementations of the reference signal generator 210, error signal generator 230, regulator 240 and duty cycle control signal generator 250.

Figure 5:
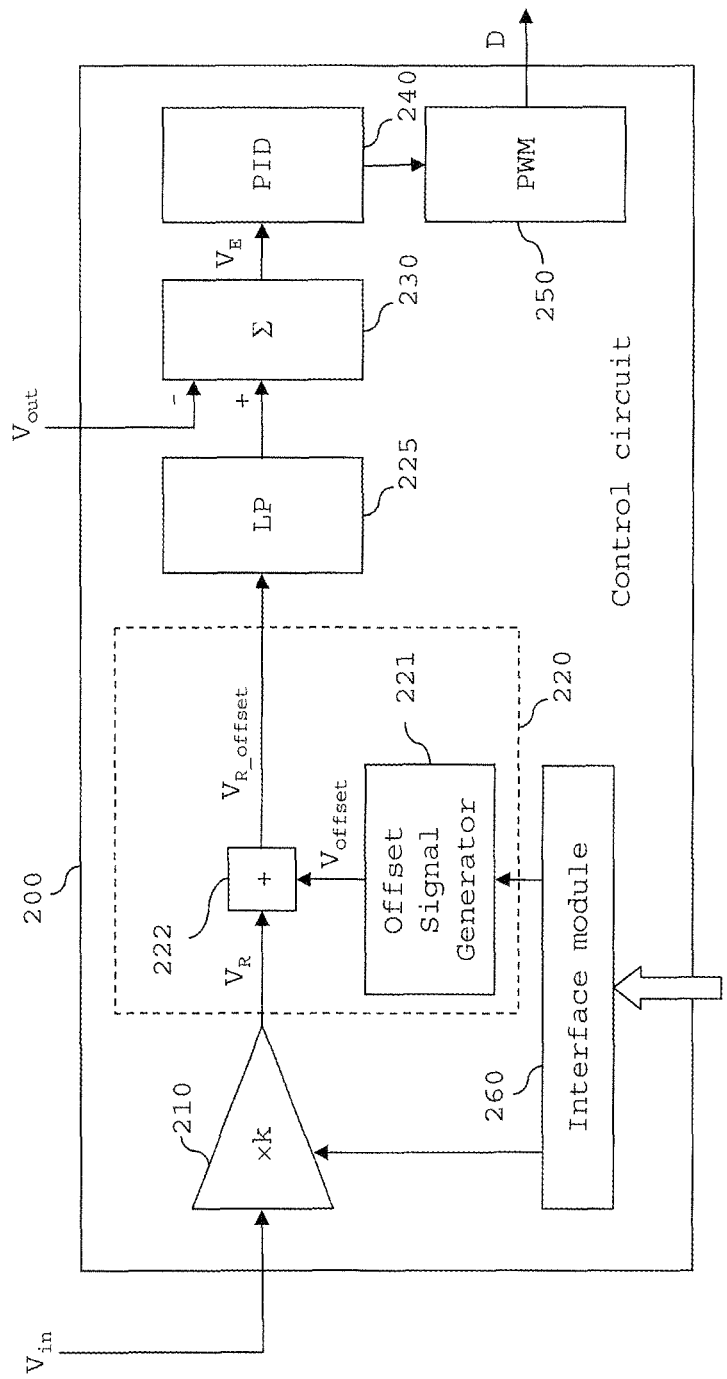
FIG. 5 is a block diagram showing yet further detail of the control circuit according to the first embodiment of the present invention.

As shown in FIG. 5, the reference signal generator 210 is configured to implement a multiplication function, specifically to multiply the received signal indicative of the SMPS input voltage $V_{in}$ (which is referred to herein and labelled in the figures as $V_{in}$) by a scaling factor k, which may be set equal to the product of a transformer turns ratio n (where $n=n_s/n_p$ and $n_s$ is the number of turns on the secondary side winding of the transformer, and $n_p$ is the number of turns on the primary side winding of the transformer) and a nominal duty cycle ratio, $D_{nom}$, of the SMPS 100. It should be noted that if the SMPS 100 does not have a transformer, then n is set equal to unity.

Therefore, the variable reference signal $V_R$ is generated by multiplying the input voltage $V_{in}$ of the SMPS 100 by the scaling factor k, in accordance with the following equation.

$$V_R = kV_{in} \qquad \text{Equation 2}$$

Moreover, in the present embodiment, the reference signal generator 210 is configured to allow the scaling factor k to be set by the user. More particularly, the reference signal generator 210 is configured to receive from the interface module 260 a signal indicative of an input from the user, which may be provided by the user entering his selection, adjustment or setting of the scaling factor k via an input device such as a key pad or touch screen. The reference signal generator 210 is arranged to set the factor k in dependence upon the received signal that is indicative of the user's input. However, it should be noted that, more generally, the reference signal generator 210 may be arranged to set, in dependence upon the received signal, one or more parameters of the above-mentioned function $f(V_{in})$ which relates the reference signal $V_R$ to the input voltage $V_{in}$, which function need not be linear in $V_{in}$.

As shown in FIG. 5, in the present embodiment, the offset reference signal generator 220 comprises an offset signal generator 221 operable to generate a variable offset signal $V_{offset}$, and an adder 222 which is arranged to add the reference signal $V_R$ and the variable offset signal $V_{offset}$ received thereby, and output the result of summing these signals to the low-pass filter 225 as an offset reference signal $V_{R\_offset}$.

In more detail, the offset signal generator 221 is arranged to receive a signal from the interface module 260 and to generate the variable offset signal $V_{offset}$ using the received signal, for example by amplifying and/or filtering, or otherwise processing the received signal. Thus, the offset signal $V_{offset}$ is a function of the received signal, although it is independent of the SMPS input voltage $V_{in}$. Depending on the requirements of the specific SMPS implementation, the offset signal generator 221 may alternatively be configured to relay the signal received from the interface module 260 (or directly from a signal source external to the control circuit 200) to the adder 222 without processing it.

More specifically, in the present embodiment, the offset signal generator 221 is arranged to receive a signal indicative of an input from a user via the interface module 260, and to generate the offset signal $V_{offset}$ in dependence on the signal that is indicative of the user's input. For example, the interface module 260 may be configured to provide an interface between the control circuit 200 and an input device such as a key pad or touch screen, via which the user can enter an amount of voltage offset which the offset signal generator 221 is to generate during operation of the control circuit 200.

The usefulness of the user being able to specify the amount of voltage offset to be applied will now be explained with reference to FIGS. 6 and 7.

Figure 6:
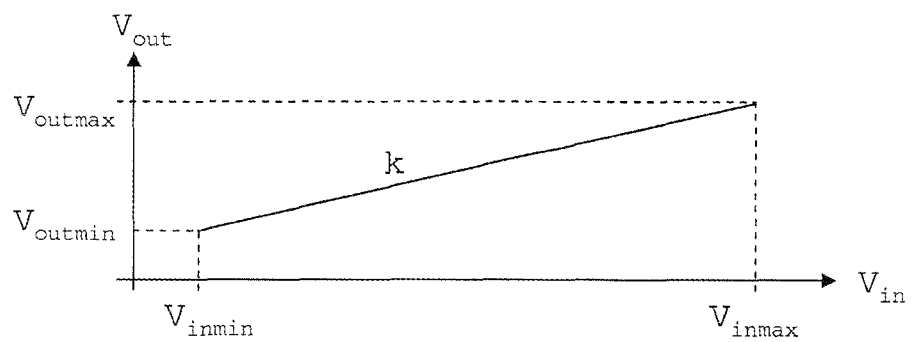
FIG. 6 illustrates the variation of the SMPS output voltage as a function of the input voltage.
Figure 7:
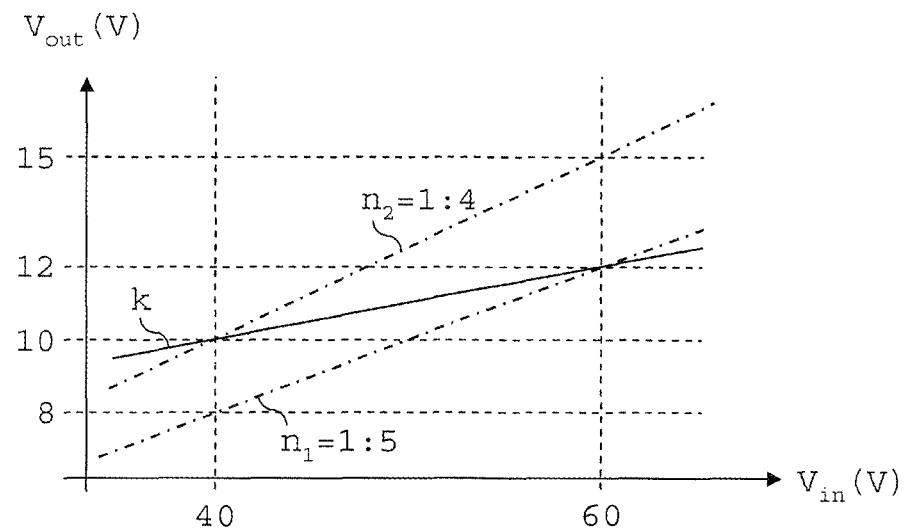
FIG. 7 illustrates the variation of the SMPS output voltage as a function of the input voltage for two exemplary fixed transformer ratios, together with a variation generated by an offset reference signal generator according of an embodiment of the present invention.

FIG. 6 illustrates a linear variation of the SMPS output voltage $V_{out}$ as a function of the input voltage $V_{in}$. The gradient k of the line shown in FIG. 6 is given by $(V_{outmax}-V_{outmin})/(V_{inmax}-V_{inmin})$, where $V_{outmax}$, $V_{outmin}$, $V_{inmax}$ and $V_{inmin}$ define the ends of the input and output voltage ranges of the SMPS 100, as illustrated. By the user being able to choose the value of k (either by making the value of k adjustable in the manner described above, or by configuring the reference signal generator 210 at the time of manufacture to perform its operation using a particular value of k), the SMPS can be made to simulate a transformer turns ratio that is different to the one actually present in the transformer of the SMPS 100. In addition, by adding an offset to the reference voltage, the user is able to set up the SMPS 100 to operate with the desired voltage conversion characteristic across any desired range of voltages. Thus, the offset reference signal $V_{R\_offset}$, obtained by combining the offset signal $V_{offset}$ with the reference signal $V_R$ generated by the reference signal generator 210, may be expressed more generally as follows:

$$V_{R\_offset} = kV_{in} + V_{offset} \qquad \text{Equation 3}$$

The ability to define any desired linear relation between the offset reference signal $V_{R\_offset}$ and the input voltage $V_{in}$ allows the user to secure the advantages of achieving higher output voltages at lower input voltage values whilst limiting the size of the output voltage at higher input voltage values. Thus, is becomes possible to obtain an increased output power level, or a lower output current, at lower input voltages. In other words, by being able to adjust the offset signal $V_{offset}$, the user is able to adjust the control circuit 200 to control the SMPS 100 to operate across desired voltage ranges as if it had an input voltage-dependent transformer turns ratio. The usefulness of being able to makes these adjustments will now be explained by way of a design example.

The SMPS of the design example is a DC-DC step-down converter which has an input voltage range of 40-60 V and a desired output voltage range of 10-12 V. Using fixed transformer ratios of $n_1=1:5$ and $n_2=1:4$ yields the dashed lines shown in FIG. 7. As is evident from these plots in FIG. 7, neither of the fixed transformer ratios $n_1$ and $n_2$ allows the converter to output voltages in the desired range of 10-12 V for input voltages between 40 and 60 V.

However voltage conversion within the desired voltage ranges may be achieved by setting k and the offset voltage $V_{offset}$ to appropriate values. More specifically, the value of k may be set according to $k=(V_{outmax}-V_{outmin})(V_{inmax}-V_{inmin})$ which in the present example yields $k=(12-10)/(60-40)=0.1$. The offset voltage, on the other hand, is given by the following expression:

$$V_{offset} = \frac{(V_{in\,max}V_{out\,min} - V_{out\,max}V_{in\,min})}{(V_{in\,max} - V_{in\,min})} \qquad \text{Equation 4}$$

In the present design example, $V_{offset}$ is calculated according to Eqn. 4 to be 6 V.

The transformer turns ratio $n_s:n_p$ to be used in the transformer of the design example is required to satisfy the following condition:

$$\frac{n_s}{n_p} \geq k + \frac{V_{offset}}{V_{in\,min}} \qquad \text{Equation 5}$$

In other words, the voltage across the secondary coil of the transformer should be larger than the output voltage $V_{out}$, over the whole working input voltage range. Thus, in the present design example, the transformer turns ratio is required to be greater than or equal to 0.25.

In order to maintain efficient and stable operation when the temperature of the SMPS 100 changes, the offset signal generator 221 may additionally or alternatively be arranged to receive a signal indicative of a measured temperature of a component (e.g. the transformer) of the SMPS 100 via the interface module 260, and generate the offset signal $V_{offset}$ in dependence upon the received signal that is indicative of the measured temperature.

Alternatively, the offset signal generator 221 of the present embodiment may additionally or alternatively be arranged to receive via the interface module 260 a signal indicative of an output load of the SMPS 100, and to generate the offset signal $V_{offset}$ in dependence upon the received signal that is indicative of the output load. The provision of such a load-dependent offset would advantageously allow the output voltage $V_{out}$ of the SMPS 100 to be tuneable so as to reduce transmission losses between the SMPS 100 and its load. For example, in a so-called "Intermediate Bus Architecture" (IBA) power system in which the SMPS 100 constitutes an intermediate bus converter (IBC) that converts a system input voltage to an intermediate bus voltage (IBV) that is applied to an intermediate bus which connects the IBC to one or more point-of-load (POL) regulators, the offset signal generator 221 could receive a signal indicative of the current and voltage output by the IBC to the POL regulator(s), and adjust the IBV so as to optimize the system efficiency for the prevailing load level. The reader is referred to WO2012/007055 for further details of this scheme for optimizing the efficiency of an IBA power system.

Referring again to FIG. 5, the error signal generator 230 in this embodiment takes the form of a difference calculator, which compares the filtered offset reference signal $V_{R\_offset}$ with a signal indicative of the output voltage $V_{out}$ of the SMPS 100. To achieve this, in this embodiment, the difference is found between the output voltage $V_{out}$ and the filtered offset reference signal $V_{R\_offset}$ to generate the error signal $V_E$:

$$V_E = V_{R\_offset} - V_{out} \qquad \text{Equation 6}$$

The error signal is then fed into a regulator 240 in the form of PID regulator. The output of the PID regulator is in a steady state and is the duty cycle required to obtain the required $V_{out}$ that is independent of the load current.

The output of the PID regulator 240 is then fed into the duty cycle control signal generator 250 which comprises a pulse width modulating (PWM) circuit that translates the duty cycle ratio (from the PID regulator 240) into a pulse width modulated signal D that controls the switching elements in the SMPS 100.

In summary, it will be understood from the description of the first embodiment above that the control circuit 200 introduces load regulation into an otherwise fixed ratio converter. Instead of using a fixed duty cycle, the duty cycle can be varied according to the load requirements and according to the input voltage $V_{in}$ of the SMPS 100. This is achieved using both the input voltage $V_{in}$ and the output voltage $V_{out}$ to generate of the duty cycle control signal D. This improves the damping of oscillations on the output due to input voltage transients, while maintaining the duty cycle near to 100%, for maximum efficiency.

In order to maintain good load regulation and transient response a design margin for the nominal duty cycle $D_{nom}$ has to be introduced. Simulations and measurements performed by the present inventors show that a margin of a few percent is enough, yielding e.g. $D_{nom} \approx 97\%$. Hence, the power efficiency of an embodiment is almost at maximum and not reduced much compared with a fixed radio converter, but the embodiment provides improved transient response and load regulation.

It should be noted that, because the duty cycle of an embodiment is controlled near the natural border of 100%, methods should be employed to avoid integral wind-up. For example, well-known saturation circuitry of the integral value can be used to address this issue.

Figure 8:
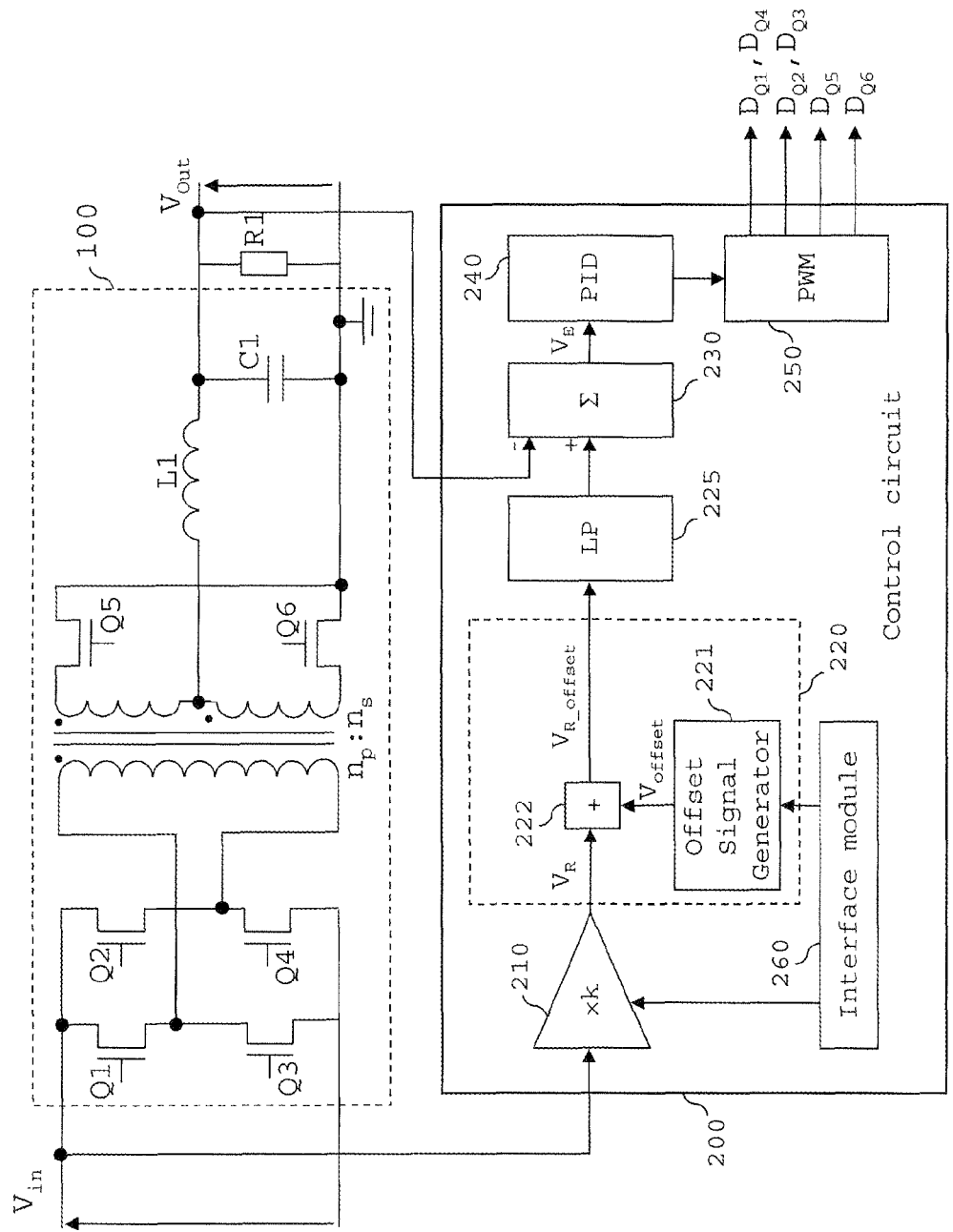
FIG. 8 is a circuit diagram showing the interconnection of the control circuit of the first embodiment with an SMPS, so that the control circuit can control the duty cycle of the SMPS.

FIG. 8 depicts the integration of an SMPS 100 with the control circuit 200 described above. In this figure, a typical SMPS 100 is shown. Operation of this SMPS 100 is achieved through control of six transistors, Q1 to Q6. Running this SMPS with a maximised duty cycle of 100% will result in maximised power efficiency. This circuit is directed to a DC-DC converter, using a transformer T1. An H-bridge is provided to generate an AC signal, formed from switching elements Q1 to Q4. Specifically, Q1 and Q4 will initially be switched ON and Q2 and Q3 switched OFF. This generates a positive-swinging signal across the transformer's primary coil thereby resulting is a change in flux. As a result, a voltage is induced across the transformer's secondary coil. Q6 can then be switched ON, and Q5 switched OFF to provide rectification of the signal. Similarly, the same is performed inversely to generate a negative-swinging signal, by turning Q1, Q4 and Q6 OFF and turning Q2, Q3 and Q5 ON to capture energy from the negative portion of the cycle.

As shown in FIG. 8, and as has been described above with reference to previous figures, the control circuit 200 has inputs indicative of the input voltage $V_{in}$ and output voltage $V_{out}$ of the SMPS 100. Based on these inputs, the control circuit 200 generates various duty cycle control signals D for controlling the various switching elements of the switched mode power supply 100, as described below. In this case the ground reference is at the secondary side.

Figure 9:
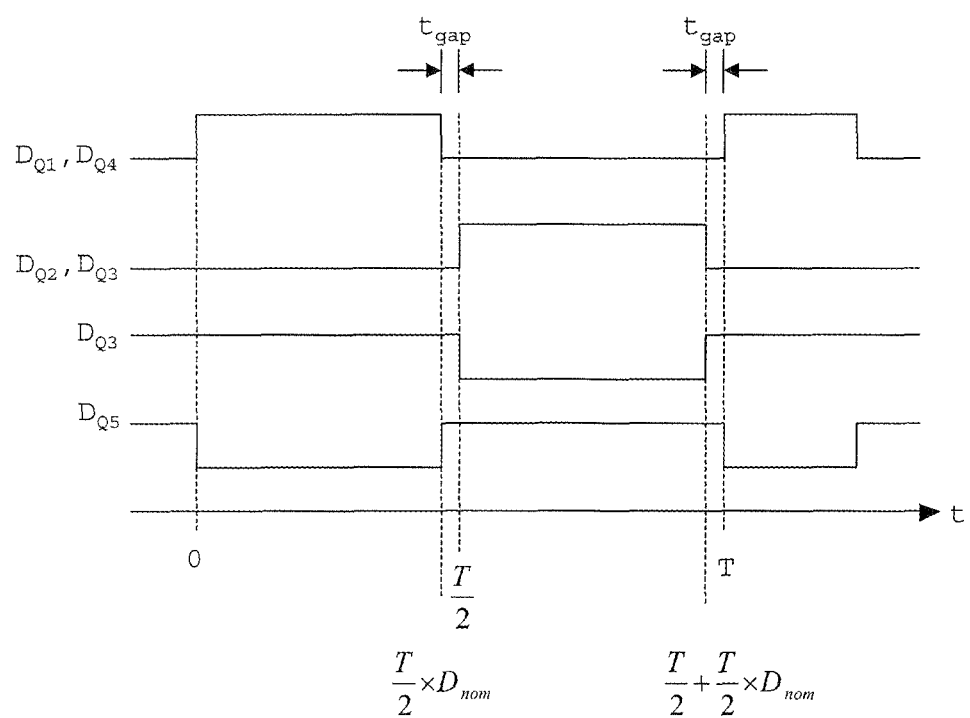
FIG. 9 is a timing diagram showing control signals, produced in the control circuit of FIG. 8, for switching elements in the SMPS.

FIG. 9 depicts an exemplary timing diagram for the various control signals as output from the control circuit 200 to control the duty cycle of the SMPS 100. The control signals relate to the switching elements of the SMPS 100, as depicted in FIG. 8. In the following explanation of FIGS. 8 and 9, the factor k is taken to be $nD_{nom}$ by way of example.

As shown in FIG. 9, the control signals for Q1 and Q4 (labelled $D_{Q1}$ and $D_{Q4}$) closely match the inverse of the control signals for Q2 and Q3 (labelled $D_{Q2}$ and $D_{Q3}$). This generates alternate positive and negative voltage cycles on the primary side of the transformer T1. This induces a changing flux in the transformer T1 and thereby induces a voltage across the secondary side of the transformer T1.

The small timing gap $t_{gap}$ between the end the control signal for Q1 and Q4 and the start of the control signal for Q2 and Q3 is due to $D_{nom}$ not being exactly 100% but instead being around 97% in the present embodiment. As a result, the length of the 'ON-time' for Q1 and Q4 is substantially $T/2 \times D_{nom}$, where T is the length of a cycle. Similarly the 'ON-time' for Q2 and Q3 is also substantially $T/2 \times D_{nom}$. The control circuit 200 controls the 'ON-time' to maintain good load regulation and transient response by controlling the size of the timing gap $t_{gap}$.

FIG. 9 also shows typical control signals for Q5 and Q6 (labelled $D_{Q5}$ and $D_{Q6}$). As shown, at the end of the first half 'ON period' for Q1 and Q4, Q5 is switched ON whilst Q6 is ON. This generates a conductive path to allow the discharging of inductor L1 into capacitor C1 and the load R. After this, Q6 is switched OFF and Q5 is left ON to perform rectification of the signal from the secondary side of the transformer T1.

Second Embodiment

A control circuit 200' according to a second embodiment of the present invention will now be described with reference to FIGS. 10 to 15.

Figure 10:
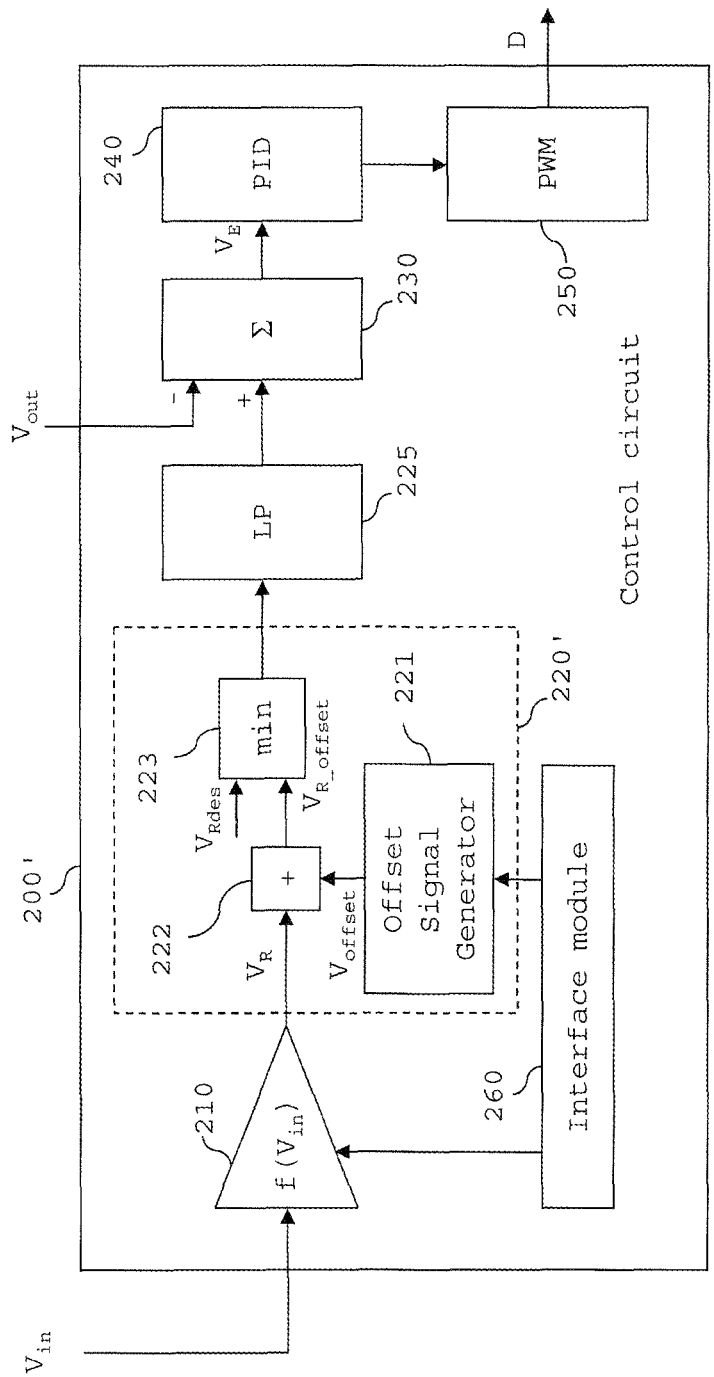
FIG. 10 shows a control circuit according to a second embodiment of the invention.

As can be appreciated from a comparison of FIGS. 5 and 10, the control circuits 200 and 200' of the first and second embodiments have many features in common, and the description of the structure and functionality of these common components will therefore not be repeated. However, the offset reference signal generator 220' of the second embodiment differs from that of the first embodiment, and the structure and operation of this component of the control circuit 200' will now be described in detail.

In a first mode of operation (also referred to herein as the "Regulated Ratio" mode), the offset reference signal generator 220' is operable to function as the offset reference signal generator 220 of the above-described first embodiment. However, in contrast to the offset reference signal generator 220 of the first embodiment, the offset reference signal generator 220' of the second embodiment is also operable in a second mode (also referred to herein as the "Fully Regulated" mode) to generate a predetermined reference signal $V_{Rdes}$ which is set to a desired level. The size of $V_{Rdes}$ may be set to a fixed value or may be made adjustable by the SMPS operator. Accordingly, during operation, $V_{Rdes}$ remains constant unless changed by the operator.

As will be explained in the following, the offset reference signal generator 220' is configured to operate in the second mode when the input voltage $V_{in}$ exceeds a threshold value, and to operate in the first mode when the input voltage $V_{in}$ is equal to or smaller than the threshold value.

For comparison, in a known fully-regulated converter, which can only use a fully-regulated control strategy, the control circuit measures the output voltage $V_{out}$ of the SMPS 100, and this is then compared with a constant reference signal equal to the desired output voltage or directly proportional to the desired output voltage, with no provision for switching to a mode of operation which employs a variable reference voltage that is dependent upon the input voltage of the SMPS. In contrast, as explained herein, in the second embodiment of the present invention, the signal output by the offset reference signal generator 220' is a function of the input voltage $V_{in}$ of the SMPS 100 in the first operational mode, and constant in the second operational mode of the offset reference signal generator 220'.

The operations performed by the control circuit 200' of the second embodiment in the first mode of operation are the same as those performed by the control circuit 200 of the first embodiment. On the other hand, the conventional processing operations undertaken when the offset reference signal generator 220' operates in the second mode of operation (i.e. Fully Regulated) are well known and will therefore not be described here.

As shown in FIG. 10, the offset reference signal generator 220' of the second embodiment comprises a reference signal selector 223, which functions to control the switching between the first and second modes of operation of the offset reference signal generator 220'. More specifically, as shown in FIG. 10, the reference signal selector 223 is operable to receive the predetermined reference signal $V_{Rdes}$ from e.g. a precision reference, and the offset reference signal $V_{R\_offset}$ from the adder 222, and then select, as the reference signal to be provided to the error signal generator 230 via the low-pass filter 225, the smaller of these received signals according to the following equation:

$$V_R = \min\{V_{R\_offset}, V_{Rdes}\} \qquad \text{Equation 7}$$

Figure 11:
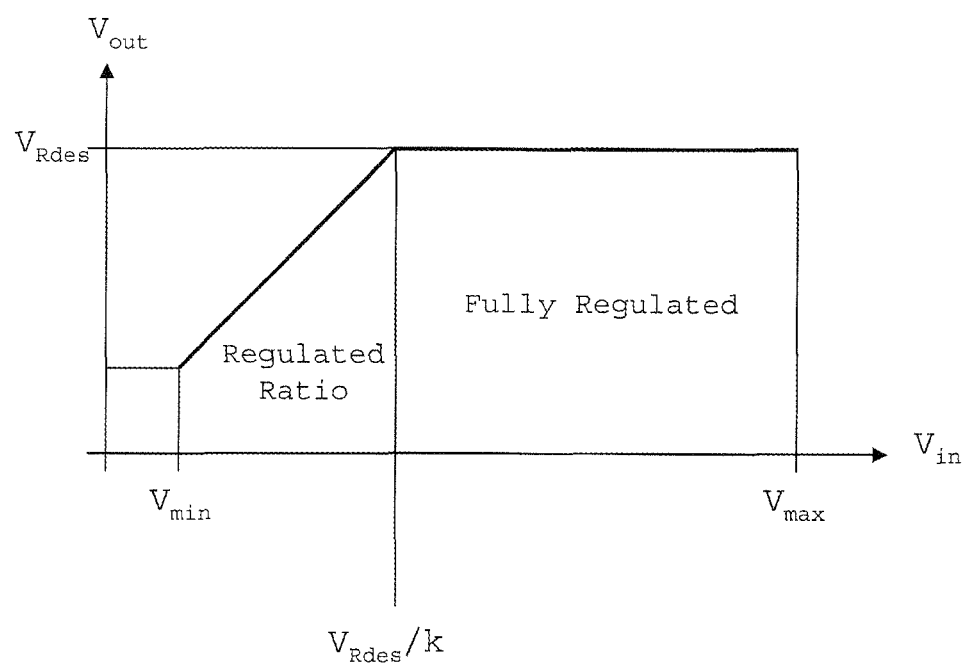
FIG. 11 illustrates the variation of the SMPS output voltage as a function of the SMPS input voltage in the second embodiment of the present invention.

In Equation 7, "min" denotes the minimum function which selects the minimum value of the operands. The output voltage $V_{out}$ as a function of the input voltage $V_{in}$ is illustrated in FIG. 11.

There are significant advantages associated with the capability of the offset reference signal generator 220' to switch from operating in one of the two above-described operational modes to the other mode, depending on the prevailing SMPS input voltage level.

Figure 12:
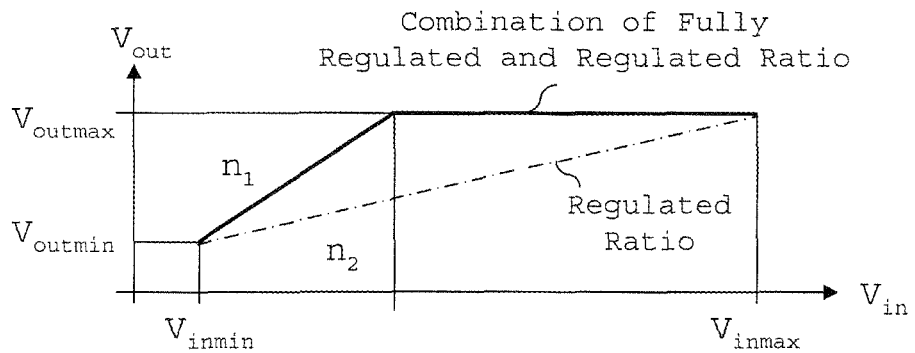
FIG. 12 is another schematic illustrating the variation of the SMPS output voltage as a function of the input voltage, which shows how the ability of the offset reference signal generator of the second embodiment to switch between the first and second operational modes allows a higher transformer ratio to be used in the SMPS.

For example, as can be appreciated from the variation of the SMPS output voltage $V_{out}$ with the input voltage $V_{in}$ shown schematically in FIG. 12, using the above-described combination of the Fully Regulated and the Regulated Ratio modes of operation (i.e. the combination of the above-described first and second modes) allows for a higher transformer turns ratio to be used in the SMPS 100 as compared to the case where the offset reference signal generator 220' is configured to operate in the Regulated Ratio mode only. As shown in FIG. 12, turns ratio $n_1$ required for the combination is greater than the turns ratio $n_2$ required when operation is limited to the Regulated Ratio mode.

Figure 13:
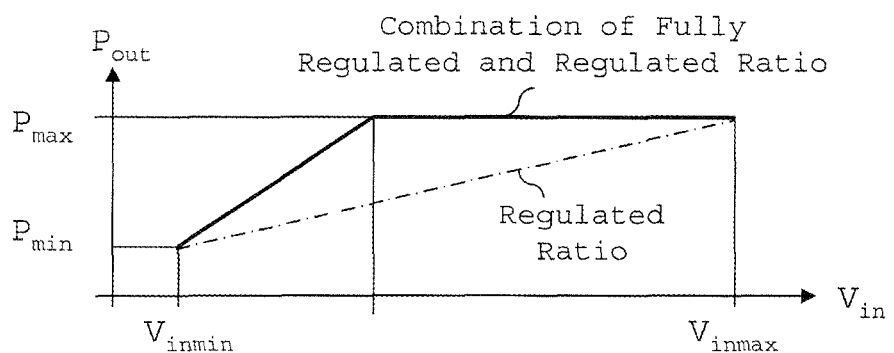
FIG. 13 is a schematic illustrating how the power output of the SMPS varies with input voltage, and shows how the ability of the offset reference signal generator of the second embodiment to switch between the first and second operational modes increases the power output of the SMPS.

Furthermore, as illustrated in FIG. 13, where the control strategy employs the above-described combination of the Fully Regulated and the Regulated Ratio operational modes, the output voltage $V_{out}$ is larger in the whole working region, which allows the output power $P_{out}$ to be increased without increasing the output current that is the limiting factor in the design.

Figure 14:
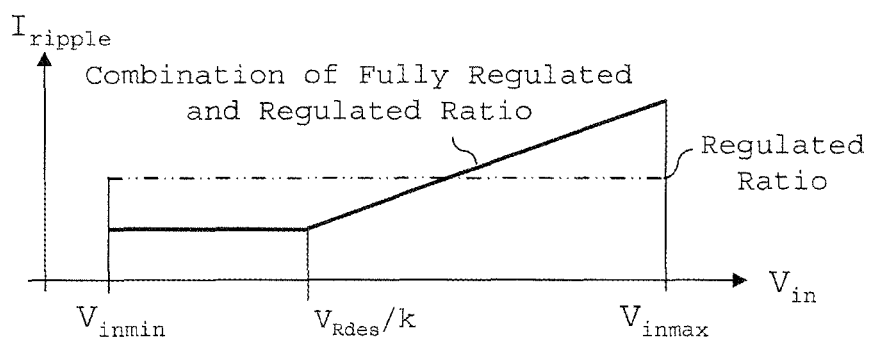
FIG. 14 is a schematic illustrating how the ripple current in the output choke of the SMPS varies with input voltage when the SMPS is controlled by a control circuit according to the second embodiment of the present invention.

FIG. 14 is a schematic illustrating the variation of the SMPS output current ripple $I_{ripple}$ with the input voltage $V_{R\_offset}$. Where the offset reference signal generator 220' operates in the Regulated Ratio mode, the output current ripple $I_{ripple}$ is constant and independent of the input voltage $V_{in}$, in contrast with the Fully Regulated part of the combination control strategy, where the current ripple $I_{ripple}$ increases with input voltage $V_{in}$. This implies that the pure Regulated Ratio can use a smaller inductor for a given ripple requirement than the combination control strategy. However, a larger inductor is preferable in terms of active current sharing.

Figure 15:
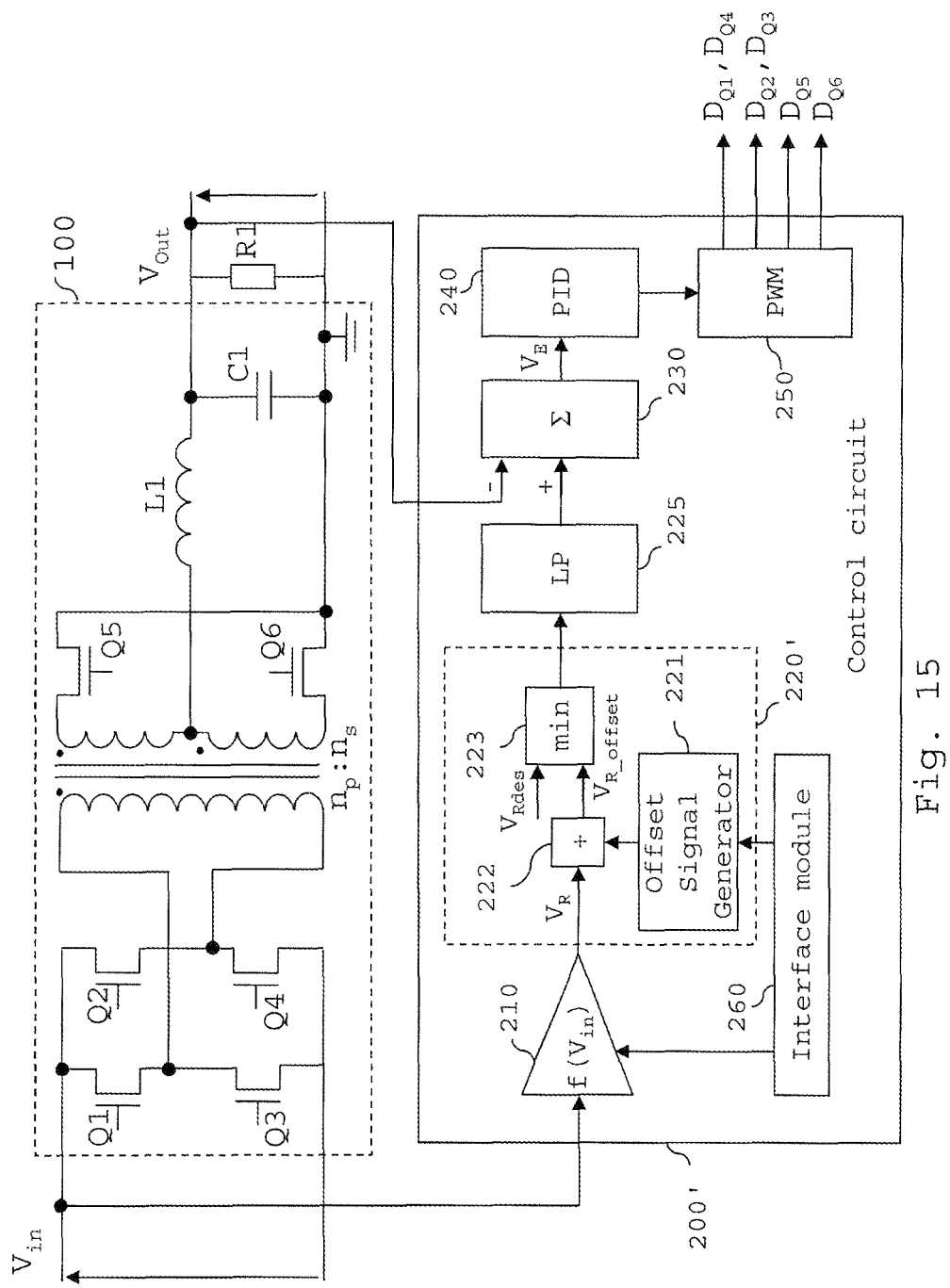
FIG. 15 is a circuit diagram showing the interconnection of the control circuit of the second embodiment with an SMPS, so that the control circuit can control the duty cycle of the SMPS.

FIG. 15 shows a power supply system comprising an SMPS 100 and a control circuit 200' arranged to generate control signals to control the duty cycle of the SMPS 100. Except for the ability of the offset reference signal generator 220' to switch between operating in the first and second mode, the components of the power supply system shown in FIG. 15 and their interactions are the same as those described above with reference to FIG. 8.

Experimental Results

The inventors have performed experiments to demonstrate the effectiveness of the low-pass filter 225 in suppressing an SMPS load current transient that would otherwise occur when the SMPS input voltage $V_{in}$ changes abruptly. The results of these studies are shown in FIGS. 16 and 17, which respectively show measurement results obtained from a background example SMPS not having the low-pass filter 225, and an SMPS according to an embodiment of the present invention, which has a low-pass filter 225 provided in the duty system control circuit as shown in FIG. 2.

In both cases, the output of the SMPS was connected to a bank of capacitors with low ESR, having a total capacitance 2.5 mF, and the input voltage $V_{in}$ to the SMPS was stepped up from 40 V to 50 V. In FIGS. 16 and 17, trace C-1 shows the measured output voltage $V_{out}$ (offset by −7.95 V for clarity of illustration), trace C-2 shows the measured input voltage $V_{in}$, and trace C-3 shows the measured load current to the load capacitor.

Figure 16:
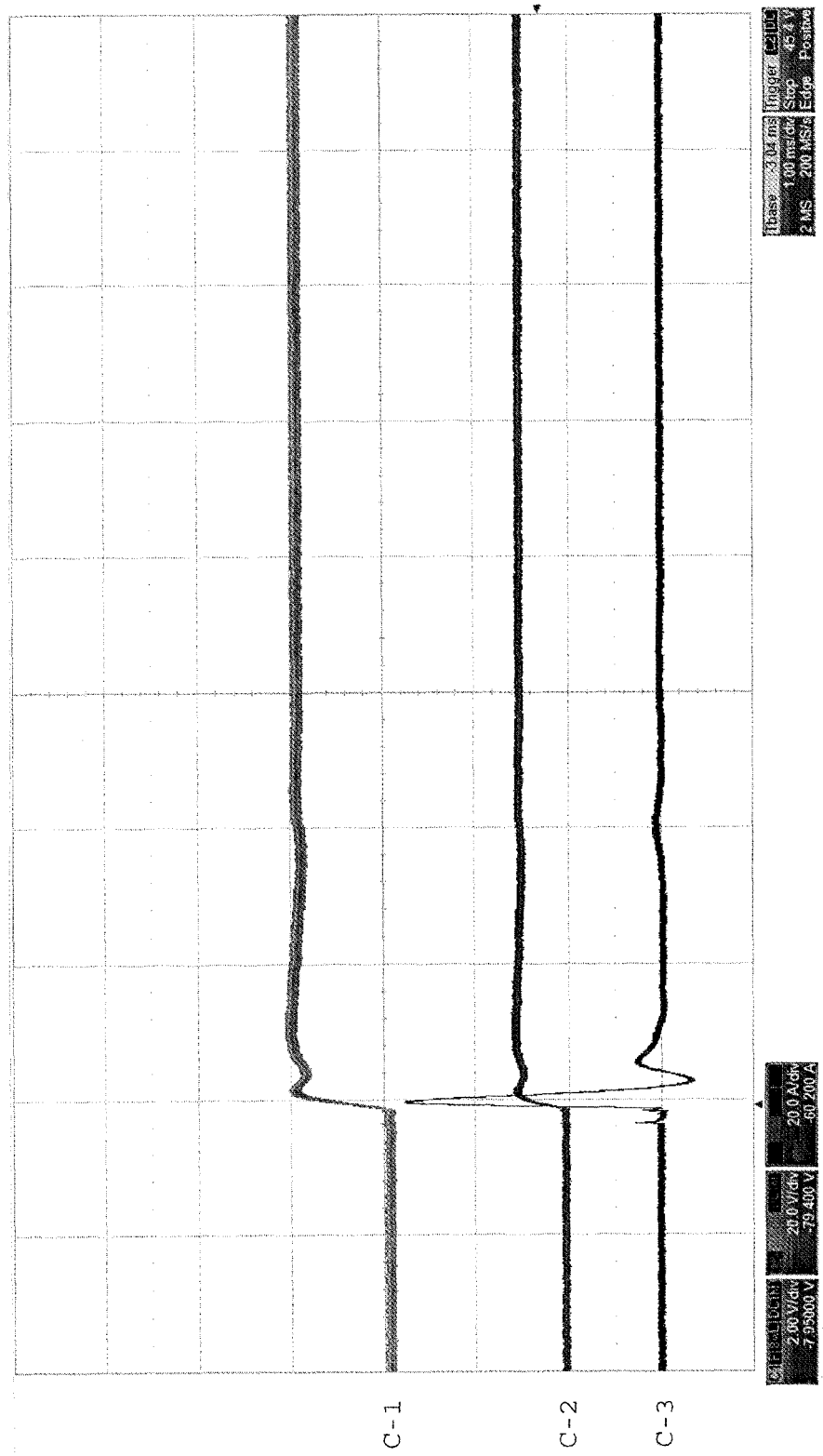
FIG. 16 shows experimental results which illustrate the large load current transient that occurs when a voltage step is applied to the input of a background example SMPS.

In the background example of FIG. 16, the load current increases sharply in response to the input voltage step, rising to a peak value of about 55 A. The output voltage $V_{out}$ changes as quickly as the input voltage $V_{in}$, which causes ringing on both the input voltage line and the output voltage line when a low impedance source with a large input capacitor is used.

Figure 17:
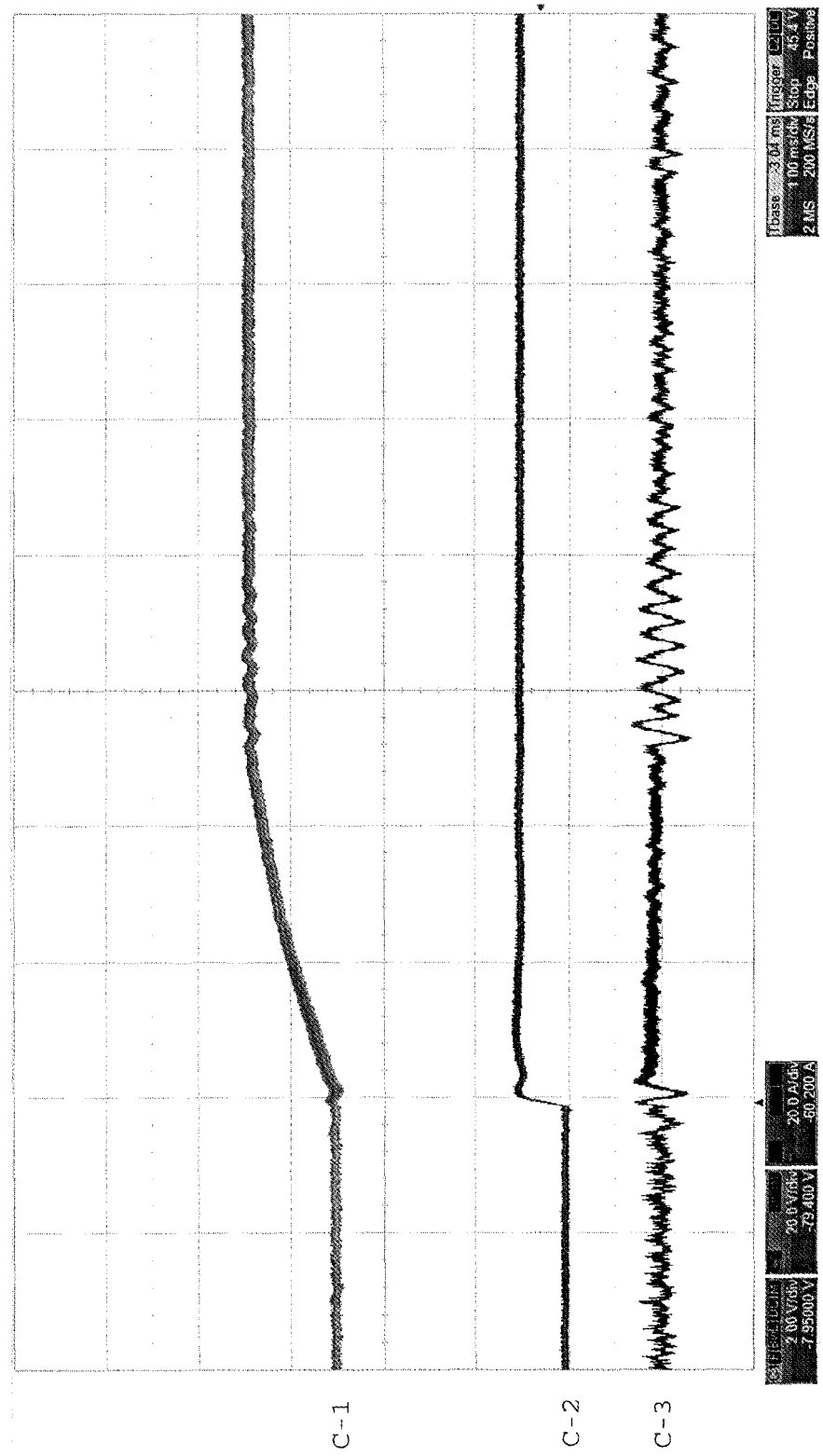
FIG. 17 shows experimental results which illustrate the effective suppression of the load current transient that occurs in an SMPS according to an embodiment of the present invention under the same experimental conditions as those in FIG. 16.

FIG. 17 shows that, in the SMPS of the embodiment, the inrush current to the load capacitors is limited to just a few amps and is therefore unlikely to trip the power supply's OCP. In this case, the input voltage step of 10 V produces a 2 V change in the output voltage $V_{out}$ over 2.5 ms, as compared to 100 microseconds or so in the case of FIG. 16. It should be noted that the noise and oscillations in the output current illustrated by trace C-3 in FIG. 17 is an artifact of the SMPS used, which was different to the SMPS used to produce the results shown in FIG. 16.

[Modifications and Variants]

Many modifications and variations can be made to the embodiments, without departing from the scope of the present invention.

For example, although the control circuit 200, 200' of the above described embodiments is a separate unit which provides control signals for controlling the duty cycle of the SMPS 100, the control unit 200, 200' may instead be incorporated within the SMPS 100.

Furthermore, the control circuit 200, 200' can be implemented using either analog or digital electronics, with no loss of performance. In a digital implementation of the control circuit 200, 200', the reference signal generator 210, the offset reference signal generator 220, the error signal generator 230 and/or the regulator 240 may be implemented as software components of that may form at least a part of a computer program, module, object or sequence of instructions executable by a programmable signal processing apparatus such as a microprocessor.

The offset reference signal generator 220' of the above-described second embodiment is configured to switch between its first and second modes of operation by the reference signal selector 223 selecting the smaller of reference signals $V_{Rdes}$ and $V_{R\_offset}$ which have been generated by a reference source and the offset reference signal generator 220, respectively. However, the switch may alternatively be performed by comparing the signal indicative of the SMPS input voltage against a threshold and then generating either $V_{Rdes}$ or $V_{R\_offset}$, depending on the result of this comparison.

Although the low-pass filter 225 is provided between the offset reference signal generator 220 and the error signal generator 230 in the embodiments described above, it should be noted that the low-pass filter 225 may alternatively be provided elsewhere in the duty cycle control circuit so as to filter the signal indicative of the SMPS input voltage or a signal based thereon before the signal is passed to the error signal generator 230. Thus, more generally, the low pass filter may be provided anywhere between the input terminal 205 and the error signal generator 230. In this connection, it should be noted that the input terminal 205 need not be provided on the circuit board of the control circuit and should be regarded more generally as any node or point in the control circuit that receives a signal indicative of the input voltage $V_{in}$. However, in some analog implementations of the duty cycle control circuit, in which one or more of the components themselves are significant sources of noise, it may be advantageous to connect the low-pass filter 225 directly to a input of the error signal generator 230, as in the above-described embodiments.

The regulator 240 may be of any type and not specifically a PID regulator. For example, it may be a PI, PD, or lead lag compensation regulator, or another type of regulator.

The control strategy, as detailed in the above described embodiments, could be complemented with voltage feed forward compensation.

Since the SMPS 100 may be an isolated SMPS 100, then the control circuit 200 could be placed on the primary or secondary side of the transformer T1. However, the preference is for placement on the secondary side. Depending on the placement of the control circuit 200, 200', then one of either the output voltage $V_{out}$ of the SMPS 100 or the input voltage $V_{in}$ of the SMPS 100 must be transferred over the isolation barrier. There are many well-known techniques for achieving this, for example sampling of the voltage on the secondary side of the transformer T1 of the SMPS 100 during the on-period is a good measurement of the input voltage, including the transformer ratio n.

Further, the control circuit 200, 200' is not limited to controlling the SMPS topology of a full-bridge, center-tapped secondary side transformer with synchronous rectification, as shown in FIGS. 8 and 15. Instead, the above described embodiments of the present invention will work equally well with many topologies including push-pull, half-bridge and forward converters topologies. The above-described control circuit 200 or 200' can used with SMPSs with a single winding secondary side transformer, and it also works with SMPSs with diode rectification on the secondary side.

The inventors have found that the above-described control circuit of embodiments of the present invention works particularly well when implemented with active droop which enables passive current sharing or the paralleling of several identical SMPS converters.

Figure 18:
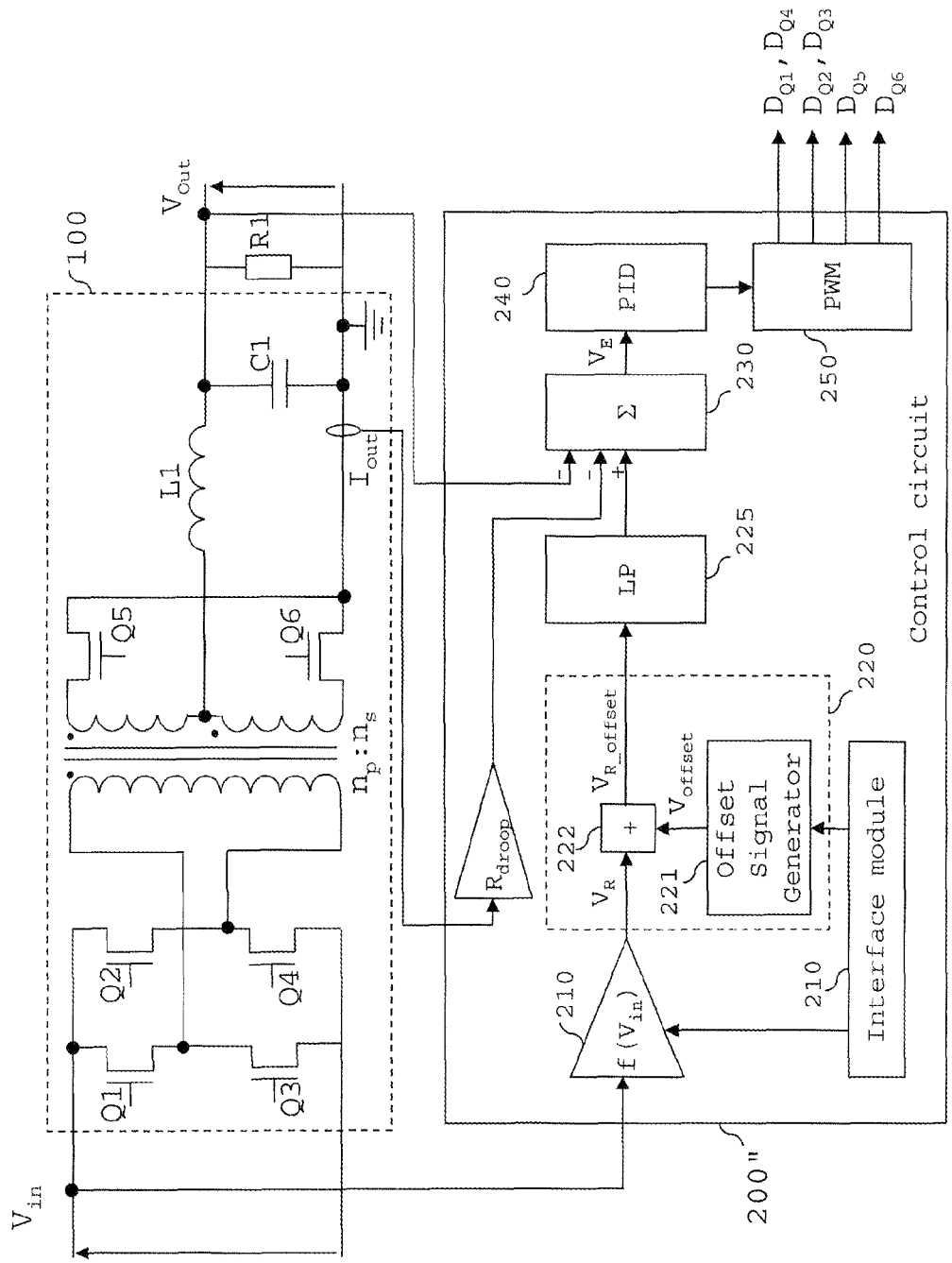
FIG. 18 shows a modification to the control circuit of the first embodiment with the inclusion of droop processing.

FIG. 18 shows a modification of the control circuit 200 of the first embodiment which incorporates active droop. In this variant, the active droop is obtained by measuring the output current $I_{out}$ and then modifying the calculation of the error signal according to the following equation:

$$V_E = \min\{kV_{in} + V_{offset}, V_{Rdes}\} - V_{out} - I_{out}R_{droop} \quad \text{Equation 8}$$

In Equation 8 above, $n = n_s/n_p$ is the transformer turns ratio if it exists in the SMPS, $V_{out}$ is the output voltage of the SMPS 100, $I_{out}$ is the output current of the SMPS 100 and $R_{droop}$ is the artificial droop resistance.

It will also be appreciated that the process steps illustrated in the flow chart in FIG. 4 may be executed in a different order to that shown. For instance, steps S301 and S302 in FIG. 4 may be interchanged, or step S302 may be executed after step S303.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A control circuit operable to generate a control signal to control a duty cycle of a switched mode power supply, the control circuit comprising:
    an input terminal for receiving a signal indicative of an input voltage ($V_{in}$) of the switched mode power supply;
    a reference signal generator operable to generate, in dependence upon the received signal, a reference signal ($V_R$) that is a function of the input voltage ($V_{in}$);
    an error signal generator arranged to receive a signal indicative of an output voltage ($V_{out}$) of the switched mode power supply and operable to generate an error signal ($V_E$) based on the reference signal ($V_R$) and based on the output voltage ($V_{out}$);
    a low pass filter connected between the input terminal and the error signal generator, in series with the reference signal generator; and
    a duty cycle control signal generator operable to generate the control signal to control the duty cycle of the switched mode power supply in dependence upon the error signal ($V_E$);
    wherein the reference signal generator is operable in a first mode to generate the reference signal ($V_R$) as a function of the input voltage ($V_{in}$) and operable in a second mode to generate a predetermined reference signal ($V_{Rdes}$) independent of the input voltage ($V_{in}$), the reference signal generator being configured to operate in the second mode when the input voltage ($V_{in}$) exceeds a threshold value, and to operate in the first mode when the input voltage ($V_{in}$) is equal to or smaller than said threshold value.

2. The control circuit according to claim 1, wherein the low pass filter has a user adjustable time constant.

3. The control circuit according to claim 1, wherein the low pass filter is arranged to respond to an increase in the input voltage ($V_{in}$) of the switched mode power supply with a first time constant, and to a decrease in the input voltage ($V_{in}$) of the switched mode power supply with a second time constant that is different from the first time constant.

4. The control circuit according to claim 1, wherein the reference signal generator comprises:
    an offset reference signal generator operable in the first mode to generate an offset reference signal ($V_{R\_offset}$) by combining the reference signal ($V_R$) generated as a function of the input voltage ($V_{in}$) with an offset signal ($V_{offset}$), the offset signal ($V_{offset}$) being independent of the input voltage ($V_{in}$);
    wherein the error signal generator is operable to generate the error signal ($V_E$) based on the offset reference signal ($V_{R\_offset}$) and based on the output voltage ($V_{out}$).

5. The control circuit according to claim 1, wherein the error signal generator is arranged to generate the error signal ($V_E$) by subtracting one of the output voltage ($V_{out}$) of the switched mode power supply and the reference signal ($V_R$) from the other of the output voltage ($V_{out}$) of the switched mode power supply and the reference signal ($V_R$).

6. The control circuit according to claim 1, wherein the error signal generator is arranged to receive a signal indicative of an output current ($I_{out}$) of the switched mode power supply and operable to generate the error signal ($V_E$) based on the reference signal ($V_R$), the output voltage ($V_{out}$) and the output current ($I_{out}$).

7. The control circuit according to claim 1, wherein the reference signal generator comprises a reference signal selector operable to select the smaller of the generated reference signal ($V_R$) and the predetermined reference signal ($V_{Rdes}$) for output by the reference signal generator.

8. A switch mode power supply having a control circuit according to claim 1.

9. The control circuit according to claim 3, wherein the first time constant is between 0.3 ms and 3 ms, and the second time constant is between 0.06 ms and 0.6 ms.

10. The control circuit according to claim 4, wherein the offset reference signal generator comprises an offset signal generator operable to generate a variable offset signal ($V_{offset}$).

11. A method of generating a control signal by a control circuit to control a duty cycle of a switched mode power supply, the method comprising:
a reference signal generation process comprising:
receiving a signal indicative of an input voltage ($V_{in}$) of the switched mode power supply;
generating, when the input voltage ($V_{in}$) is equal to or smaller than a threshold value, a reference signal ($V_R$) that is a function of the input voltage ($V_{in}$); and,
generating, when the input voltage ($V_{in}$) exceeds said threshold value, a predetermined reference signal ($V_{Rdes}$) independent of the input voltage ($V_{in}$);
wherein at least one low-pass filtering operation is performed as part of the reference signal generation process so that the reference signal is a filtered signal;
an error signal generation process comprising:
receiving a signal indicative of an output voltage ($V_{out}$) of the switched mode power supply; and,
generating an error signal ($V_E$) based on the reference signal ($V_R$) and based on the output voltage ($V_{out}$); and,
a duty cycle control signal generation process, comprising generating a control signal to control the duty cycle of the switched mode power supply in dependence upon the error signal ($V_E$).

12. The method according to claim 11, further comprising adjusting a time constant of a low pass filter used in said low-pass filtering operation in accordance with a capacitance of a load capacitor connected to an output of the switched mode power supply so as to maintain a size of the charge or discharge current of the load capacitor within a predetermined range of values.

13. The method according to claim 11, wherein the error signal ($V_E$) is generated by subtracting one of the output voltage ($V_{out}$) of the switched mode power supply and the reference signal ($V_R$) from the other of the output voltage ($V_{out}$) of the switched mode power supply and the reference signal ($V_R$).

14. The method according to claim 11, wherein:
the error signal generation process further comprises receiving a signal indicative of an output current ($I_{out}$) of the switched mode power supply; and,
the error signal ($V_E$) is generated based on the reference signal ($V_R$), the output voltage ($V_{out}$) and the output current ($I_{out}$).

15. The method according to claim 11, wherein:
the reference signal generation process further comprises generating an offset reference signal ($V_{R\_offset}$) by combining the reference signal ($V_R$) with an offset signal ($V_{offset}$), the offset signal ($V_{offset}$) being independent of the input voltage ($V_{in}$); and,
the error signal ($V_E$) is generated based on the offset reference signal ($V_{R\_offset}$) and based on the output voltage ($V_{out}$).

16. The method according to claim 15, wherein a variable offset signal ($V_{offset}$) is generated.

17. The method according to claim 12, wherein the low pass filter is arranged to respond to an increase in the input voltage ($V_{in}$) of the switched mode power supply with a first time constant, and to a decrease in the input voltage ($V_{in}$) of the switched mode power supply with a second time constant, the method comprising adjusting the first and second time constants in accordance with the capacitance of the load capacitor so as to maintain the size of the charge and discharge currents of the capacitor within respective predetermined ranges of values.

* * * * *